United States Patent
Mayr et al.

(10) Patent No.: US 10,466,659 B2
(45) Date of Patent: Nov. 5, 2019

(54) METHOD FOR DESIGNING A NON-LINEAR CONTROLLER FOR NON-LINEAR PROCESSES

(71) Applicant: AVL LIST GMBH, Graz (AT)

(72) Inventors: Christian Mayr, Hadersdorf am Kamp (AT); Stefan Jakubek, Vienna (AT); Christoph Hametner, Vienna (AT); Nikolaus Keuth, Graz (AT)

(73) Assignee: AVL List GmbH, Graz (AT)

( * ) Notice: Subject to any disclaimer, the term of this patent is extended or adjusted under 35 U.S.C. 154(b) by 644 days.

(21) Appl. No.: 14/771,036

(22) PCT Filed: Feb. 19, 2014

(86) PCT No.: PCT/EP2014/053180
§ 371 (c)(1),
(2) Date: Aug. 27, 2015

(87) PCT Pub. No.: WO2014/131661
PCT Pub. Date: Sep. 4, 2014

(65) Prior Publication Data
US 2016/0011571 A1    Jan. 14, 2016

(30) Foreign Application Priority Data

Feb. 28, 2013 (AT) .............................. A 50129/2013

(51) Int. Cl.
*G05B 13/04* (2006.01)
*G06F 17/16* (2006.01)
(Continued)

(52) U.S. Cl.
CPC .............. *G05B 13/04* (2013.01); *G05B 11/42* (2013.01); *G05B 13/0265* (2013.01);
(Continued)

(58) Field of Classification Search
CPC ............ C12Q 1/6883; C12Q 2600/106; C12Q 2600/156; C12Q 2600/172; G05B 11/42;
(Continued)

(56) References Cited

U.S. PATENT DOCUMENTS 3,618,025 A * 11/1971 Tomozawa ........... H04B 14/026
370/280
6,415,272 B1    7/2002 Ulyanov
(Continued)

FOREIGN PATENT DOCUMENTS

| CN | 101488010 | 7/2009 |
| CN | 101900991 | 12/2010 |
| DE | 3618025 A1 * | 12/1987 |

OTHER PUBLICATIONS

Novak, Nonlinear System Identification and Control Using Local Model, Feb. 2007.*
(Continued)

*Primary Examiner* — Kenneth M Lo
*Assistant Examiner* — Mohammad A Rahman
(74) *Attorney, Agent, or Firm* — Dykema Gossett PLLC (57) ABSTRACT

For the determination of a non-linear controller for a non-linear system it is proposed that a parameter set ($K_{PID}(k)$) of the controller (1) is determined by means of an optimization using a multi-criteria evolutionary algorithm, in which algorithm a plurality of parameter sets ($K_{PID}(k)$), which each represent a possible solution of the optimization, are determined in each evolution step and at least two quality values ($f_i$) are determined for each parameter set ($K_{PID}(k)$) and the quality values ($f_i$) are optimized by the multi-criteria evolutionary algorithm.

6 Claims, 6 Drawing Sheets

(51) Int. Cl.
*G05B 11/42* (2006.01)
*G05B 13/02* (2006.01)
*G05B 17/02* (2006.01)
*G06N 3/12* (2006.01)

(52) U.S. Cl.
CPC ............. *G05B 17/02* (2013.01); *G06F 17/16* (2013.01); *G06N 3/126* (2013.01)

(58) Field of Classification Search
CPC .... G05B 13/0265; G05B 13/04; G05B 17/02; G06F 17/16; G06N 3/126
See application file for complete search history.

(56) References Cited

U.S. PATENT DOCUMENTS

| | | | |
|---|---|---|---|
| 7,011,379 B2 | 3/2006 | Rader et al. | |
| 7,398,257 B2 | 7/2008 | Kaji | |
| 8,760,461 B2 * | 6/2014 | Kobayashi | G09G 5/02 345/519 |
| 9,404,833 B2 * | 8/2016 | Stadlbauer | G05B 13/042 |
| 2002/0078429 A1 * | 6/2002 | Yoshida | G03F 7/70725 716/55 |
| 2006/0052991 A1 * | 3/2006 | Pflugl | G05B 13/027 703/8 |
| 2009/0240401 A1 * | 9/2009 | Rosch | H02H 7/0851 701/49 |
| 2011/0015847 A1 * | 1/2011 | Kanke | G01M 15/02 701/93 |
| 2011/0295777 A1 * | 12/2011 | Jang | G05B 23/0221 706/12 |
| 2014/0067197 A1 * | 3/2014 | Stadlbauer | G05B 13/042 701/32.8 |

OTHER PUBLICATIONS

Soltoggio, Evolutionary Algorithms in the Design and Tuning of a Control System, Jun. 2004. (Year: 2004).*
Novak, Nonlinear System identification and Control Using Local Model, Feb. 2007 (Year: 2007).*
English Abstract of CN 101900991.
English Abstract of CN 101488010.
Satpati B. et al. "Robust controller design for course changing / course keeping control of a ship using PSO enabled automated quantitative feedback theory." TENCON 2008. IEEE Region 10 Conference Nov. 19, 2008, pp. 1-6.
Deb, K. "Multi-objective optimization using evolutionary algorithms." Cinchester: John Wiley & Sons Ltd., 2009.
Li, L.D. et al. "A modified PSO algorithm for constrained multi-objective optimization." International Conference on Network and System Security, 2009, pp. 462-467.

* cited by examiner

METHOD FOR DESIGNING A NON-LINEAR CONTROLLER FOR NON-LINEAR PROCESSES

The present invention relates to a method for designing a non-linear controller for non-linear processes which are modelled in the form of a local model network.

Linear controllers, such as for example PID controllers (proportionately integral derivative controllers), are widely used for controlling linear systems. However, conventional linear controllers only function unsatisfactorily for non-linear systems. Most real processes, though, are non-linear. Therefore it has been already proposed to approximate non-linear systems by local linearizations, wherein linear controllers can be designed for the local linear system, Such local linearizations of a non-linear system take place for example using multiple model approaches, for example local model networks (LMN). The use of a local model network (LMN) in this connection is a known method, in which interpolation takes place between different local models which are valid in different operating ranges (input variables). Linear controllers, such as for example PID controllers, are then designed for the different local models, and the global controller output is again determined by interpolation of the local controller outputs. Modelling using neural networks or fuzzy logic constitutes an alternative approach.

A decisive criterion in each regulated system is the stability of the closed control loop. Therefore in the control loop a designed controller must satisfy a specific stability criterion, such as for example a known bounded-input bounded-output (BIBO) or a Lyapunov criterion.

Likewise it is desirable that a desired behavior of the closed control loop is achieved over the entire output variable range, that is to say that for example in specific output variable ranges no undesirably high control deviations or overshooting occur.

In the normal controller design the stability and the behavior of the closed control loop are checked after the controller has been designed. If a quality value is not met, the controller design must be repeated, which is naturally complex and ineffective in practice. Furthermore, therefore, optimization of the two quality values of stability and behavior of e closed control loop is not possible even at the controller design stage, or can only be implemented at substantial cost.

Therefore it is an object of the present invention to provide a method for designing a non-linear controller for non-linear systems which are modelled in the form of a local model network, wherein specific quality value for the closed control loop can be taken into account.

This object is achieved according to the invention in that a parameter set of the con roller is determined by means of an optimization using a multi-criteria evolutionary algorithm, in which algorithm a plurality of parameter sets, which each represent a possible solution for the optimization, are determined in each evolution step and thereby at least two quality values are determined for each parameter set and the quality values are optimized by the multi-criteria evolutionary algorithm. In this way the required quality values are already taken into account in the controller design and are not determined only after the controller design. However, the quality values are not only taken into account, but during the controller design they are also optimized, so that with regard to these quality values the designed controller actually constitutes an optimum, that is to say a best possible controller design in this respect.

Advantageously a quality value for the stability of the control loop and a quality value for the behavior of the control loop are determined and optimized as quality values, since these are conventional criteria for the evaluation of a control loop. For this purpose the quality value for the stability of the control loop is preferably determined using a Lyapunov criterion with a decay rate, the decay rate being used as a quality value. For the quality value of the behavior of the control loop a desired value signal and a permissible tolerance range of the output variable around the desired value signal are defined and a measurement for complying with this tolerance range is used as a quality value.

Especially advantageously, a characteristic map is created for a determined controller parameter from the determined non-linear controller, and this characteristic map can then be used for example in a control device in a vehicle in order to control specific variables. In this way characteristic maps in vehicle control devices can be directly determined and parameterized and no longer have to be calibrated laboriously at the test bench, for which purpose a large number of test runs with the testpiece (for example internal combustion engine, transmission, drive train, vehicle) were also always necessary in the past. For this purpose a Pareto front with possible optimal controller parameters can be determined as a result of the optimization and from this a parameter set is selected as a solution. This can then be checked on a testpiece for example by a test run at the test bench.

The present invention is explained in greater detail below with reference to FIGS. 1 to 11, which show by way of example, schematically and without limitation, advantageous embodiments of the invention. In the drawings.

Figure 1:
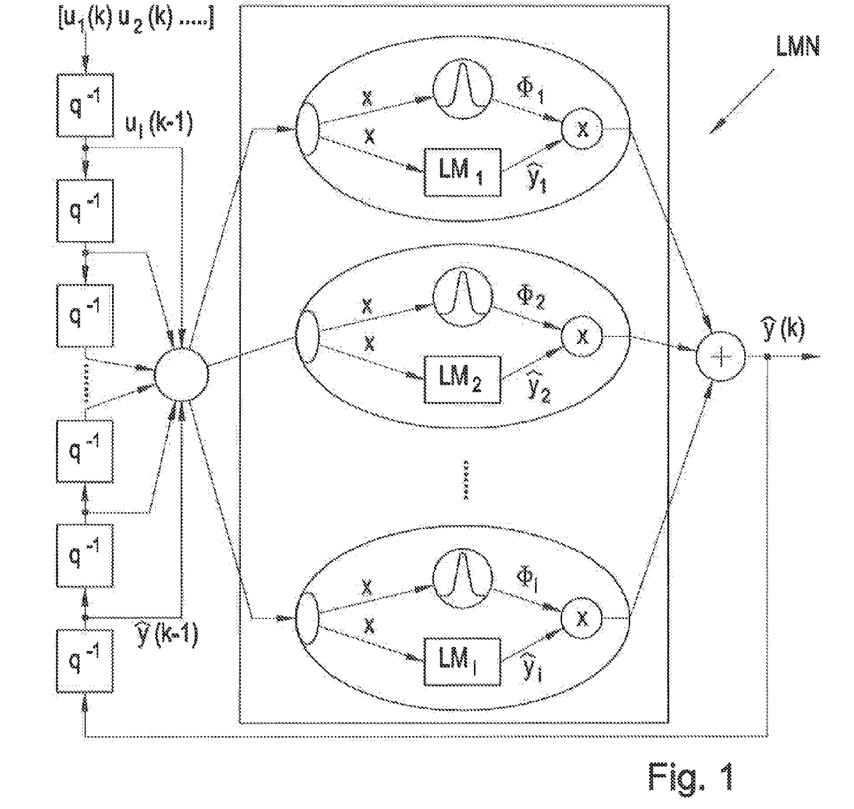
FIG. 1 shows an example of a local model network.

The aim of the present invention is to design a non-linear controller for a non-linear control path or a non-linear process. For this purpose it is initially assumed that the non-linear process is modelled in the form of a time-discrete local model network (LMN). LMNs are sufficiently known and there is comprehensive literature about methods for identification of a non-linear process by means of an LMN, and for this reason there is only a brief reference thereto in connection with FIG. 1. An LMN interpolates between local models $LM_i$, which are in each case valid in specific operating ranges (or ranges of the input variables $u_i$). In this case each i-th local model $LM_i$ of the LMN can consist of two parts, namely a validity function $\Phi_i$ and a model parameter vector $\theta_i$. The model parameter vector $\theta_i$ comprises ail parameters for the i-th model and the validity function $\Phi_i$ defines the validity range of the i-th local model within the partitioning space which is a lower space of the input space. A local estimated value of the output variable $\hat{y}_i(k)$ as output of the i-th local model $LM_i$ at the time k is obtained from $\hat{y}_i(k)=x^T(k)\theta_i$, wherein $x(k)$ designates a regression vector which includes present (k) and past (k-n) inputs and outputs $u_i$, $\hat{y}_i(k)$. The global model output $\hat{y}(k)$ is then obtained from a linear combination with a weighting of the M local model outputs by the validity function $\Phi_i$ in the form $$\hat{y}(k) = \sum_{i=1}^{M} \Phi_i(k)\hat{y}_i(k).$$

Figure 2:
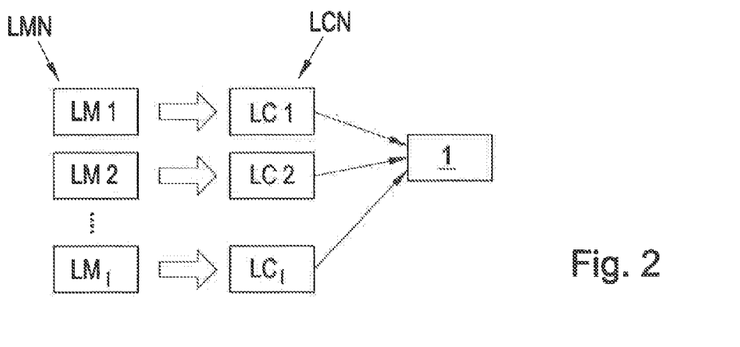
FIG. 2 shows a local model network with a local controller network.

For each local model $LM_i$ a local linear controller $LC_i$ is created, as illustrated in FIG. 2. This produces a local controller network (LCN). The global non-linear controller 1 is then again produced by linear combination of the local linear controllers $LC_i$ in accordance with the validity ranges thereof, as in the LMN.

Figure 3:
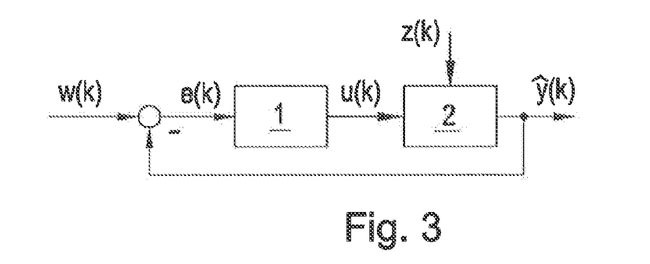
FIG. 3 shows a block diagram of control loop.

The control loop is then produced in a known manner as illustrated in FIG. 3. The output variable $\hat{y}(k)$ is fed back to the input and subtracted from a desired value w(k), resulting in a control deviation e(k) which is delivered to the controller 1 which calculates therefrom a manipulated variable u(k) (=model input) for the non-linear process 2 or for the LMN modelling the process. Additional disturbance variables z(k) can be taken into account. The known time-discrete linear control rule is produced, as is known, as $u(k)=u(k-1)+d_0 e(k)+d_1 e(k)+d_0 e(k-1)+d_2 e(k-2)$ with the coefficients $$d_0 = K_P\left[1 + \frac{T_V}{T_S}\right],$$

$$d_1 = K_P\left[\frac{T_S}{T_N} - \frac{2T_V}{T_S} - 1\right] \text{ and}$$

$$d_2 = K_P \frac{T_V}{T_S}.$$

In this case $K_P$, $T_N$ and $T_V$ are the controller parameters and $T_N$ is the sampling time. This control rule can be reformulated with $e(k)=w(k)-\hat{y}(k)$. For an i-th local PID controller the time-discrete linear control rule then follows as $u^{(i)}(k)=u^{(i)}(k-1)+K_{PID}^{(i)}(k)w^{(i)}(k)-K_{PID}^{(i)}(k)\hat{y}^{(i)}(k)$, wherein the matrix $K_{PID}^{(i)}(k)$ includes the controller parameters $K_P$, $T_N$ and $T_V$ of the individual local PID controllers. The global matrix of the controller parameters $K_{PID}(k)$ is then obtained again in accordance with the LMN as a linear combination of $K_{PID}(k)=\Sigma\Phi_i K_{PID}^{(i)}(k)$. Thus different controller parameters $K_{PID}(k)$ of the non-linear controller 1 are produced for different input variables.

Figure 4:
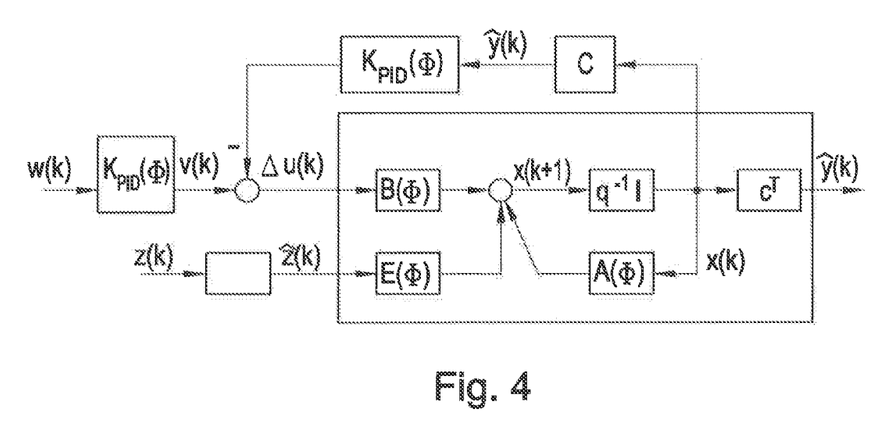
FIG. 4 shows a block diagram of the control loop in a state space representation.

As is known, the control rule can be brought equivalently into the state space representation with the state x (not to be confused with the regression vector x from the LMN), in the form $x(k+1)=A(\Phi)x(k)+B(\Phi)\Delta u(k)+E(\Phi)\hat{z}(k)$, $\hat{y}(k)=Cx(k)$. With the system matrix $A(\Phi)=\Sigma\Phi_i A_i(k)$, the input matrix $B(\Phi)=\Sigma_i B_i(k)$, the disturbance matrix $E(\Phi)=\Sigma\Phi_i E_i(k)$ and the output matrix C. $\Delta u(k)$ is produced from $\Delta u(k)=K_{PID}(k)w(k)-K_{PID}(k)\hat{y}(k)$. The state space representation is illustrated by way of example in FIG. 4. In order to keep the number of state variables small, the time lags of the disturbance variables are carried out externally (indicated by the block which receives the disturbance variables z(k)). The disturbance matrix E includes the associated model parameters. Equivalent control rules and state space representations also exist for other linear controllers. This is standard control theory, and therefore is not dealt with in greater detail here.

The controller parameters $K_{PID}(k)$ of the linear controller 1 defined above are now determined by means of a multi-criteria evolutionary algorithm. Such algorithms are likewise sufficiently known, for example as a multi-criteria genetic algorithm (multi-objective genetic algorithm or, abbreviated, multiGA). Evolutionary algorithms generally operate in an analogous manner to natural evolution, where stronger individuals have a higher probability of succeeding. The "strength" of an individual is measured in this case with quality values $f_i$ (fitness function). In every step of the multi-criteria evolutionary algorithm a plurality of individuals are generated and for each individual the quality value $f_i$ defined therefor is calculated. In the generation of the new individuals two mechanisms apply, as in nature: heredity and mutation. The individuals of a generation are mixed and newly combined, in order to produce the next generation of individuals. On the basis of the quality values $f_i$ better individuals have a greater chance of passing on their genes (controller parameters) to the next generation (the better ones succeed). The mutation is a random change to the genetic information (controller parameters). In this case the aim of the optimization is generally to minimize the quality values $f_i$, wherein the maximization may also be the aim of the optimization. Such algorithms are sufficiently known and there is also adequate literature in this connection, for example K. Deb, "Multi-objective optimization using evolutionary algorithms," Cinchester: John Wiley & Sons Ltd., 2009 or L. D. Li, X. Yu, X. Li, and W. Guo, "A Modified PSO Algorithm for Constrained Multi-objective Optimization," presented at the International Conference on Network and System Security, 2009, pp. 462-467.

Figure 5:
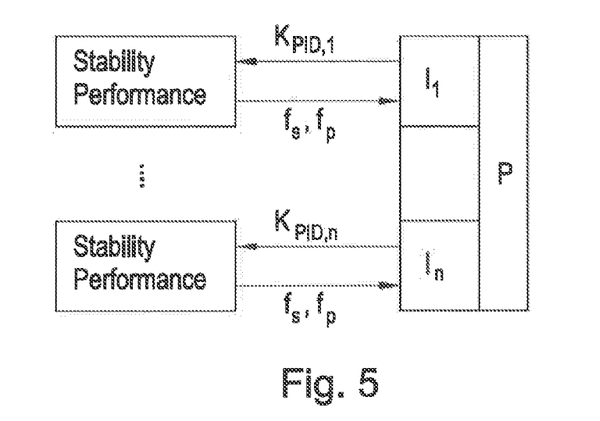
FIG. 5 shows a schematic representation of the sequence of the controller design.

In the specific application illustrated in FIG. 5, a parameter set $K_{PID}(k)$ of the controller 1 represents an individual, and a stability criterion and a criterion for the behavior of the control loop are used as quality values $f_s$, $f_p$. Any parameters $K_{PID}(k)$ can be predetermined for initialization. For initialization, however, existing methods can also be used, such as for example the known command pidtune from MATLAB®, which determines a good starting point for the controller parameters $K_{PID}(k)$ for the multi-criteria evolutionary algorithm. At every step of the evolutionary algorithm a pool of individuals $I_1 \ldots I_n$ is determined, which in total represent the population P of the evolutionary algorithm. The quality values $f_s$, $f_p$ are then determined for every single individual of every pool of individuals $I_1 \ldots I_n$. With the aid of the quality values $f_s$, $f_p$ the individuals of the next generation are then determined according to the rules of the multi-criteria evolutionary algorithm. The termination of the optimization takes place after either a predetermined number of generations or desired quality values $f_p$ are reached.

For the two quality values $f_s$, $f_p$ for evaluation of the stability and of the behavior of the closed control loop, the following approaches are for example now made.

For the stability, for example, a known approach according to Lyapunov on the basis of the above state space representation is made, wherein a Lyapunov function V(x) is sought which meets the following requirements:

i) $V(x(k)=0)=0$
ii) $V(x(k))>0$ for $x(k)\neq 0$
iii) $V(x(k))\rightarrow\infty$ for $\|x(k)\|\rightarrow\infty$
iv) $\Delta V(x(k))=V(k+1)-\alpha^2 V(k)\leq 0$ In this case for LMN it is usual to limit the Lyapunov function V(x) to quadratic functions $V(k)=x^T(k)Px(k)>0$ with $P\succ >0$. In this case P is a positive definite matrix and α is a degree of decay. As an alternative to this of course other known Lyapunov functions may be considered, such as for example piecewise quadratic or fuzzy Lyapunov functions.

The criterion for the stability is then produced for a quadratic Lyapunov function V(x) as:

$$P > 0$$
$$inf\{0 < \alpha < 1 : \Lambda_{ii}^T P \Lambda_{ii}^T + X_{ii} < \alpha^2 P\}$$
$$inf\{0 < \alpha < 1 : \Lambda_{ij}^T P \Lambda_{ij}^T + X_{ij} < \alpha^2 P\} \text{ with}$$

$$\tilde{X} = \begin{pmatrix} X_{11} & X_{12} & \ldots & X_{1l} \\ X_{12} & X_{22} & \ldots & X_{2l} \\ \vdots & & \ddots & \vdots \\ X_{1l} & X_{2l} & \ldots & X_{ll} \end{pmatrix}$$

$$\forall i \in \mathcal{F}, \forall i < j \le l$$

$$\Lambda_{ii} = G_{ii}, \Lambda_{ij} = \frac{G_{ij} + G_{ji}}{2},$$

$$G_{ij} = A_i - B_i K_{PID,j}^T C$$
$$G_{ii} = A_i - B_i K_{PID,i}^T C.$$

The LMN controlled by the controller 1 is exponentially stable if there are symmetrical matrices P and $X_{ij}$ and a degree of decay a by which the above conditions are met. The above system of equations can be solved by available equation solvers, wherein here the degree of decay α is used as a quality value $f_s$ for the stability, that is to say $f_S = \alpha$ ($K_{PID,t}^T$, $\forall i \in \mathfrak{S}$).

Figure 6:
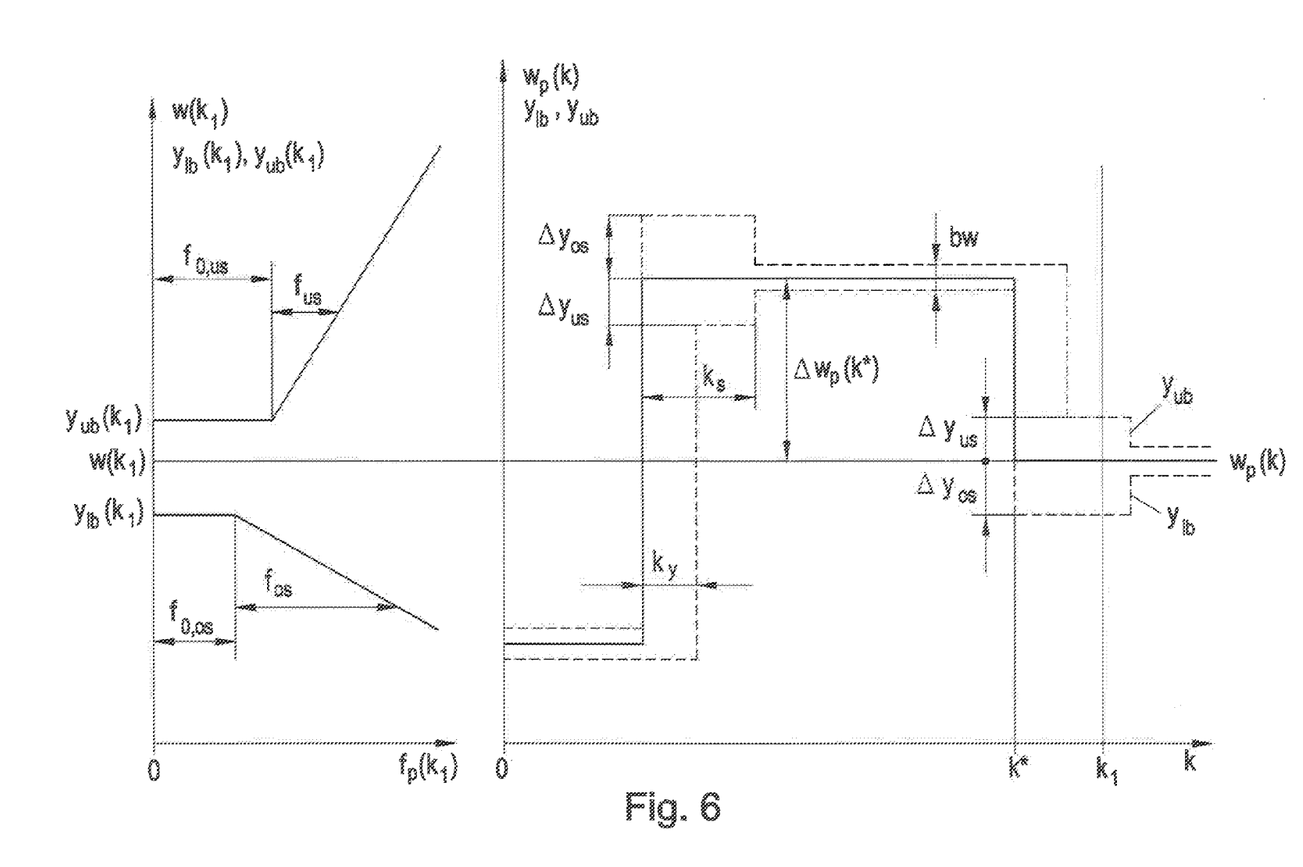
FIG. 6 shows an example for the determination of the quality value for the behavior of the control loop.

For the behavior of the closed control loop, first of all for the output ŷ(k) a desired value signal $w_p(k)$ is generated with a length of time K, for example using a design of experiment method, which preferably covers the entire output range of the LMN, in order to detect the global behavior of the closed control loop. The quality value $f_p$ for the behavior of the closed control loop is then based on upper and lower limiting values $y_{ub}$, $y_{ib}$ for the reference signal $w_p(k)$ and conventional behavior criteria, such as for example overshooting $\Delta y_{os}$, undershooting $\Delta y_{us}$, build-up time $k_r$, settling time $k_s$ and bandwidth $b_w$. Thus a permissible tolerance range around the desired value signal $w_p$ is defined. Thus the allowed range of the output variable between the upper and lower threshold value $y_{ub}$, $y_{ib}$, that is within the tolerance range, is defined, as illustrated by way of example in FIG. 6. The quality value $f_p$ is then produced from $$f_p = \sum_{k=1}^{K} f_p(k) \text{ with}$$

$$f_p(k) = \begin{cases} f_{0,os} + f_{os} & \text{sign}(\Delta w_p(k^*))(y(k) - y_{ub}(k)) > 0 \\ 0 & y_{lb}(k) \le y(k) \le y_{ub}(k) \\ f_{0,us} + f_{us} & \text{sign}(\Delta w_p(k^*))(y(k) - y_{lb}(k)) > 0 \end{cases}$$

and $$f_{os} = \begin{cases} c_{os}|y(k) - y_{ub}(k)| & \text{sign}(\Delta w_p(k^*)) = 1 \\ c_{os}|y(k) - y_{lb}(k)| & \text{sign}(\Delta w_p(k^*)) = -1 \end{cases}$$

$$f_{us} = \begin{cases} c_{us}|y(k) - y_{ub}(k)| & \text{sign}(\Delta w_p(k^*)) = -1 \\ c_{us}|y(k) - y_{lb}(k)| & \text{sign}(\Delta w_p(k^*)) = 1 \end{cases}.$$

The coefficients $c_{os}$ and $c_{us}$ describe the rise of the quality value $f_p$ when the system output ŷ(k) departs from the permissible range between the limiting values $y_{ub}$, $y_{ib}$. Thus the quality value $f_p$ for the behavior of the control loop is a measure for staying within the tolerance range. For the determination of the quality value $f_p$ the control loop (FIG. 3) is supplied with the desired value signal $w_p$ for each parameter set $K_{PID}(k)$. The limiting values $y_{ub}$, $y_{ib}$ are determined or predetermined, for example by a user, with the aid of conventional parameters such as build-up time $k_r$, settling time $k_s$, overshooting $\Delta y_{os}$, undershooting $\Delta y_{us}$ and bandwidth $b_w$.

Figure 7:
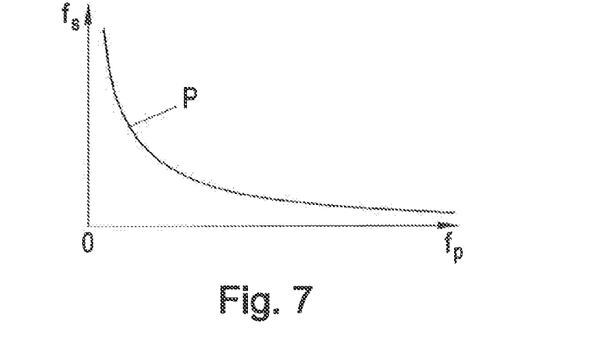
FIG. 7 shows the solutions of the controller design in the form of a Pareto front.

By means of the multi-criteria evolutionary algorithm a plurality of quality values $f_i$ can be optimized (minimized or maximized) and associated parameter sets $K_{PID}(k)$ can be determined, several possible optimal solutions being available. In this case the quantity of optimal solutions may be represented as a Pareto front. The Pareto front is known to contain all solutions in which it is not possible to improve a quality value $f_i$ without thereby contemporaneously impairing another quality value $f_j$. For the case of the two quality values $f_s$, $f_p$ a Pareto front P is obtained for example, as illustrated in FIG. 7. Behind each point of the Pareto front P there is an associated parameter set $K_{PID}(k)$ of the controller 1, which in each case constitutes a possible optimal solution of the controller design. Thus all that remains is to select a specific solution and with it a specific parameter set $k_{PID}(k)$ from the possible optimal solutions.

Additionally the different quality criteria $f_i$ in the optimization could also be weighted in order to evaluate the significance thereof.

Figure 8:
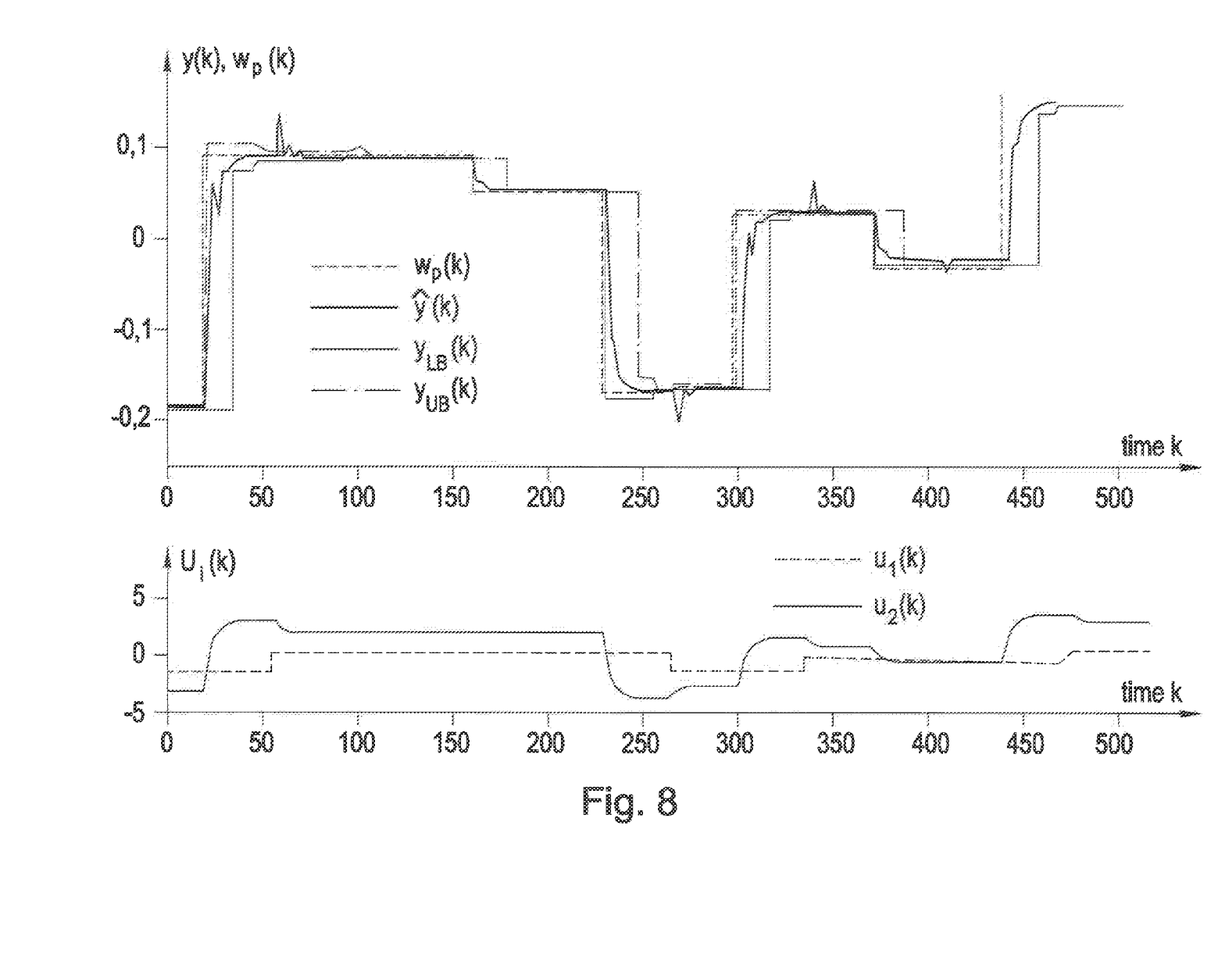
FIG. 8 shows the result of the control of a non-linear process by the designed non-linear controller and FIGS. 9 to 11 show examples of characteristic maps of the controller parameters.

FIG. 8 shows the result of the design of a PID controller according to the above method. In the above diagram the desired value $w_p(k)$ and the output variable ŷ(k) are shown together with the limiting values $y_{ub}$, $y_{ib}$ for the quality value $f_p$. The input variables $u_1$ and $u_2$ are shown in the lower diagram. The good approximation to the desired value setting by the designed controller can be seen.

The method is preferably carried out on a computer which is programmed to implement the method. Alternatively a computer cluster can also be used in order to spread the required computing power over a plurality of computers.

The determined non-linear controller could then be implemented for example in a control unit in order to determine the manipulated variables as a function of the input variables in real time in order to control the non-linear process.

Figure 9:
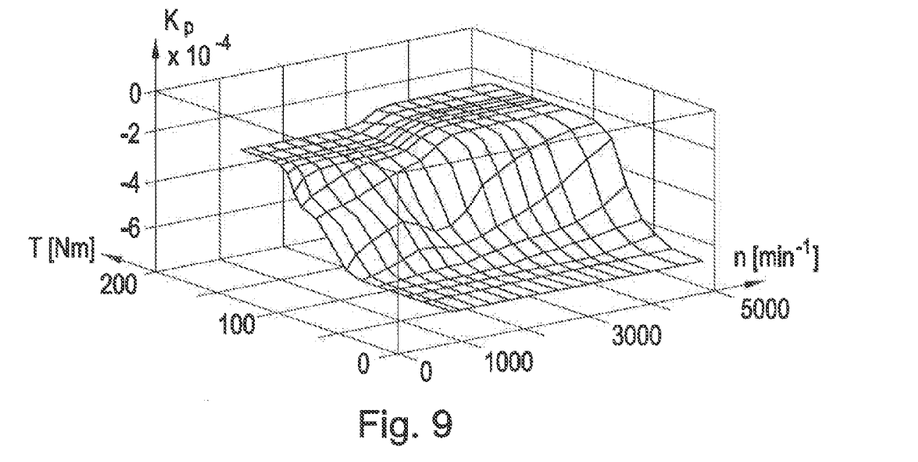
Figure 10:
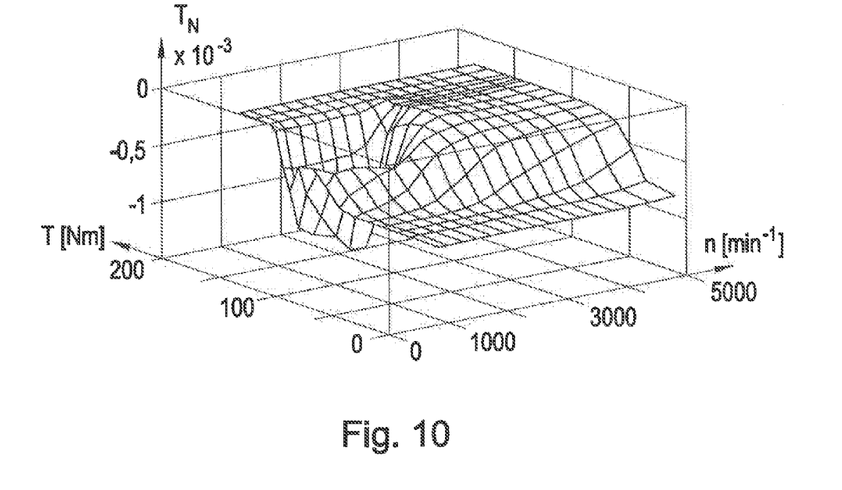
Figure 11:
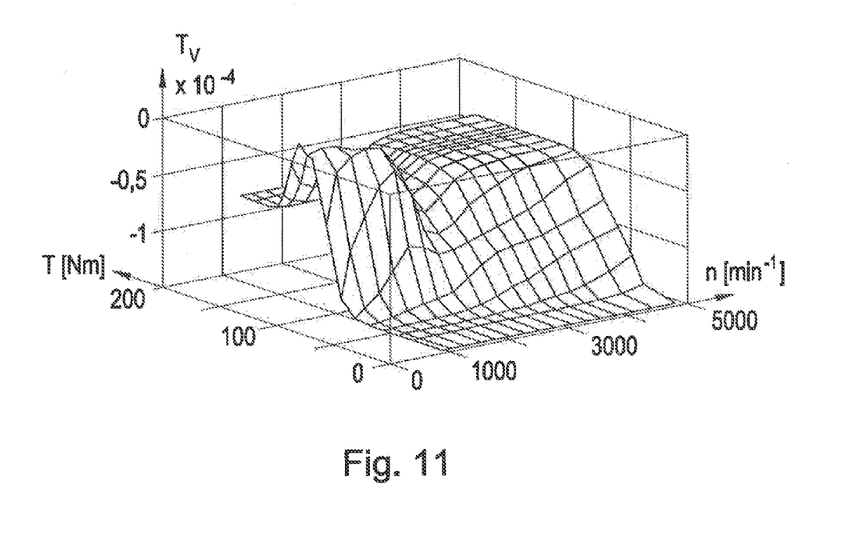
Figure 12:
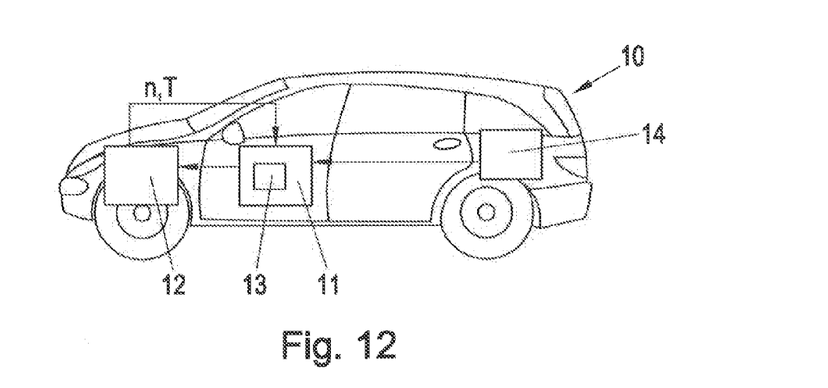
FIG. 12 shows the use of characteristic maps for controlling an internal combustion engine of a vehicle.

However, characteristic maps for the controller parameters $K_P$, $T_N$ and $T_V$ (or $d_0$, $d_1$, $d_2$) can be determined or parameterized from the determined non-linear controller 1 or the determined parameter set $K_{PID}(k)$ as a function of the input variables. The method can be used for example in the automotive field in control devices 11 of internal combustion engines 12 in vehicles 10 (FIG. 12), where the structure of the characteristic maps 13 implemented in the control device 11 is predetermined and during the calibration the characteristic maps 13 are to be filled with data. In the predetermined controller structure of the control devices 11 characteristic maps for the controller parameters are used which are generally dependent upon the load (amount of fuel injected or torque T) and speed n. In this case other variables can also be detected by sensors and supplied to the control device. The method allows a model-based fully automatic generation of these characteristic maps 13. With this characteristic map-based controller structure, for example, the charging pressure is controlled with the aid of turbochargers and/or exhaust gas recirculation. For this purpose the non-linear controller can be determined for the non-linear section. The required characteristic maps 13 of the controller parameters $K_P$, $T_N$ and $T_V$ can then be determined with the aid of the controller. FIGS. 9 to 11 show by way of example the characteristic maps 13 determined in this way for the controller parameters $K_P$, $T_N$ and $T_V$ as a function of the input variables of torque T and speed n. Alternatively characteristic maps for the parameter $d_0$, $d_1$, $d_2$ could be created.

The invention claimed is:

1. A method for designing a non-linear controller for non-linear processes which are modelled in the form of a local model network, the method including the steps of:
    determining a parameter set ($K_{PID}(k)$) of the controller by means of an optimization using a multi-criteria evolutionary algorithm, in which the multi-criteria evolutionary algorithm determines a plurality of parameter sets ($K_{PID}(k)$), where each of the parameter sets represent a possible solution of the optimization;
    determining, in each evolution step, and for each parameter set ($K_{PID}(k)$) a first quality value ($f_s$) for the stability of a control loop and a second quality value ($f_p$) for the behavior of the control loop;
    optimizing the first and second quality values ($f_s$, $f_p$) using the multi-criteria evolutionary algorithm; and
    controlling the non-linear process using the non-linear controller defined by the determined parameter set based on the optimized first and second quality values.

2. The method according to claim 1, wherein the first quality value ($f_s$) for the stability of the control loop is determined using a Lyapunov criterion with a decay rate ($\alpha$), the decay rate ($\alpha$) being used as the first quality value ($f_s$).

3. The method according to claim 1, wherein a desired value signal ($w_p$) and a permissible tolerance range of the output variable ($\hat{y}(k)$) around the desired value signal ($w_p$) are defined and a measurement for complying with this tolerance range is used as the second quality value ($f_p$).

4. The method according to claim 1, wherein as a result of the optimization a Pareto front (P) with possible optimal parameter sets ($K_{PID}(k)$) is determined and a parameter set ($K_{PID}(k)$) is selected therefrom as a solution.

5. The method according to claim 1, wherein for a parameter of the parameter set ($K_{PID}(k)$) a characteristic map is created as a function of the input variables.

6. The method according to claim 5, wherein the characteristic map is used to regulate one or more control specific variables of a vehicle.

* * * * *